(12) United States Patent
Finkenzeller et al.

(10) Patent No.: US 9,400,072 B2
(45) Date of Patent: Jul. 26, 2016

(54) MARITIME SUPPLY LINE

(75) Inventors: Stefan Michael Finkenzeller, Reichertshofen (DE); Georg Hofner, Hilgertshausen (DE); Ulli Wiedenmann, Schrobenhausen (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 429 days.

(21) Appl. No.: 13/536,499

(22) Filed: Jun. 28, 2012

(65) Prior Publication Data

US 2013/0168955 A1    Jul. 4, 2013

(30) Foreign Application Priority Data

Jun. 28, 2011 (EP) .................... 11005269

(51) Int. Cl.
*F16L 23/04* (2006.01)
*F16L 1/26* (2006.01)
*F16L 23/12* (2006.01)
*H01R 13/523* (2006.01)

(52) U.S. Cl.
CPC . *F16L 23/04* (2013.01); *F16L 1/26* (2013.01); *F16L 23/12* (2013.01); *H01R 13/523* (2013.01)

(58) Field of Classification Search
CPC ............... F16L 23/04; F16L 3/26; F16L 1/26; F16L 23/12; H01R 13/523
USPC ............ 285/124.1–124.5, 27, 363, 406, 407, 285/410; 138/89
See application file for complete search history.

(56) References Cited

U.S. PATENT DOCUMENTS

| 3,165,341 | A | * | 1/1965 | Burns et al. .................... 285/406 |
| 3,843,168 | A | | 10/1974 | Morrill et al. |
| 4,103,500 | A | * | 8/1978 | Nobileau et al. .............. 405/193 |
| 4,138,178 | A | | 2/1979 | Miller et al. |
| 4,335,752 | A | * | 6/1982 | Sumner .......................... 138/97 |

(Continued)

FOREIGN PATENT DOCUMENTS

| EP | 1630466 A1 | 3/2006 |
| GB | 2063390 A | 6/1981 |

(Continued)

OTHER PUBLICATIONS

An Office Action; "Notice of Allowance" issued by the Japanese Patent Office on Jul. 1, 2014, which corresponds to Japanese Patent Application No. 2012-142930 and is related to U.S. Appl. No. 13/536,499.

(Continued)

*Primary Examiner* — Daniel P Stodola
*Assistant Examiner* — Zachary Dragicevich
(74) *Attorney, Agent, or Firm* — Studebaker & Brackett PC

(57) ABSTRACT

The invention relates to a maritime supply line with at least two line elements which respectively comprise a jacket pipe, at least two inner lines which are arranged in the jacket pipe and a connecting element arranged at least at one end of the line element for the formation of a watertight connection to a line element to be connected. It is provided according to the invention that the connecting element comprises a connecting flange with a radially projecting collar, on which a radially projecting collar of a connecting flange of the line element to be connected can be placed. For the formation of the watertight connection the two radially projecting collars are incorporated by at least one tensioning clamp and are axially tensioned against each other.

16 Claims, 4 Drawing Sheets

(56) References Cited

U.S. PATENT DOCUMENTS

| | | | |
|---|---|---|---|
| 4,579,372 A | | 4/1986 | Morrill |
| 5,611,680 A | | 3/1997 | Small et al. |
| 5,707,089 A | * | 1/1998 | Fend .............................. 285/411 |
| 6,688,930 B2 | * | 2/2004 | Cottrell et al. ..................... 441/5 |
| 2009/0142950 A1 | | 6/2009 | Schimmele-Brell et al. |
| 2010/0038899 A1 | * | 2/2010 | Clover et al. .............. 285/120.1 |

FOREIGN PATENT DOCUMENTS

| | | |
|---|---|---|
| GB | 2459442 A | 10/2009 |
| JP | S60-52497 U | 4/1985 |
| JP | H07-35889 U | 7/1995 |
| JP | 2002-199531 A | 7/2002 |
| KR | 2009-0035421 A | 4/2009 |
| WO | 2005/116505 A1 | 12/2005 |

OTHER PUBLICATIONS

An Office Action; "Decision of Rejection" issued by the Japanese Patent Office on Jan. 28, 2014, which corresponds to Japanese Patent Application No. 2012-142930 and is related to U.S. Appl. No. 13/536,499; with English language comments.

An Office Action; "Notice of Preliminary Rejection" issued by the Korean Patent Office on Oct. 1, 2013, which corresponds to Korean Patent Application No. 10-2012-0069466 and is related to U.S. Appl. No. 13/536,499; with English language translation.

An Office Action issued by the Canadian Patent Office on Nov. 22, 2013, which corresponds to Canadian Patent Application No. 2,778,578 and is related to U.S. Appl. No. 13/536,499.

European Search Report; EP11005269; Nov. 18, 2011.

* cited by examiner

MARITIME SUPPLY LINE

The invention relates to a maritime supply line with at least two line elements which respectively comprise a jacket pipe, at least two inner lines which are arranged in the jacket pipe and a connecting element arranged at least at one end of the line element for forming a watertight connection to the line element to be connected.

Such supply lines serve for example for the connection of underwater units to supply vessels. By means of the supply line for example energy, data and various fluids are fed to the underwater unit so that it can work in the desired way for example at the bottom of the sea or a lake. Such a supply line comprises various lines within a jacket pipe corresponding to the supply to be provided.

In order to adapt to different working depths the supply line is constructed from a plurality of line elements which can be connected to each other via connecting elements.

These connecting elements on maritime supply lines must fulfil the most varied requirements. On the one hand they must guarantee a reliable connection of the inner lines. On the other hand a mechanically stable and also watertight and pressure-resistant connection of the outer jacket must be guaranteed.

A known maritime supply line follows for example from U.S. Pat. No. 4,138,178. In the connecting element shown here plug connections are provided for the inner lines, while the outer jacket pipe is connected via a thread connection with a clamping nut. The combination of inner plug connections and an outer lying clamping nut always requires for closure of the connection a certain axial play of the clamping nut, whereby this makes particular sealing measures necessary. In principle thread connections can only be used with great resources in supply lines with larger diameters. In case of harsh maritime use the threads are additionally prone to being damaged. Furthermore this known connection is relatively large in axial and radial terms, whereby a winding of the supply line onto a drum is made considerably more difficult or even impossible.

It is the object of the invention to indicate a maritime supply line with at least two line elements which can be connected to each other in a simple and mechanically stable manner.

The object is achieved according to the invention through a maritime supply line having the features of claim 1. Preferred embodiments are indicated in the dependent claims.

The inventive maritime supply line is characterised in that the connecting element comprises a connecting flange with a radially projecting collar, on which a radially projecting collar of a connecting flange of the line element to be connected can be placed and in that in order to form the watertight connection the two radially projecting collars are enclosed by at least one tensioning clamp and are axially tensioned against each other.

According to one aspect of the invention a flange connection is to be provided on the line elements of the supply line. Through the axial arrangement of two, preferably equally formed, flanges a liquid-tight connection which is also resistant to high pressures can be created.

According to a further aspect of the invention it is thereby essential that the connecting flanges comprise radially projecting collars which are enclosed by at least one tensioning clamp and are axially tensioned against each other. Corresponding to the tensioning force to be applied a particularly stable and also sealed connection is achieved.

In contrast with threads an inventive flange connection can be actuated simply and rapidly in a maritime supply line. In addition the mechanically simple and compact parts are robust and thus scarcely prone to breakdown even with harsh maritime use.

By way of tensioning clamps in principle different tensioning elements can be used which can apply an axial force to both connecting flanges. According to the invention it is particularly preferable that the tensioning clamp is formed annularly with at least two tensioning clamp shells. Such tensioning clamp shells which are in the form of part of a ring form an additional outer lying protection around the connecting flanges.

It is particularly advantageous according to the invention that an annular abutment region is arranged on the connecting flange for placing of the connecting flange of the line element to be connected and that a tensioning region is provided on a rear side of the collar facing away from the abutment region. The abutment regions and the tensioning regions of the opposing connecting flanges are preferably equally formed. In this arrangement the delicate abutment regions provided for sealing lie one against the other, while the rear tensioning regions point outwardly on the collar.

According to a particular embodiment of the invention the abutment region thereby comprises a planar radial sealing wall and the tensioning region is conically formed with an annular conical tensioning flank. By means of the planar annular sealing walls a large sealing surface is achieved, which is advantageous for good sealing.

It is thereby particularly preferable according to the invention that the tensioning clamp is formed with a U-shaped cross-section with two radially extending tensioning surfaces, of which at least one tensioning surface is designed conically corresponding to the conical tensioning region of the collar. By pushing the two approximately half circle form shells of the tensioning clamp one onto the other it is possible by means of the conical tensioning surfaces of the tensioning clamp in cooperation with the annular conical tensioning flanks on the connecting flanges for this radial movement to be converted similarly to a wedge type valve mechanism into an axial movement of the connecting flanges. High contact forces can hereby be achieved on the sealing walls. A force-locking and shape-locking connection is hereby achieved.

In order to produce high tensioning forces it is provided according to the invention that the annular tensioning clamp comprises a pulling means, through which the at least two tensioning clamp shells can be pulled together. This pulling means which in a simple case can be a screw bolt allows with usual tools in a simple way the application of high pulling forces on the tensioning clamp and thus high contact forces on the connecting flanges lying against each other.

In principle the sealing wall can be finely mechanically machined in such a way that separate sealing elements on the sealing walls are not necessary. In principle sealing liquids, sealing pastes or flat seals are possible as sealing means. It is particularly preferable according to the invention that at least one sealing ring is arranged on the annular sealing wall of the abutment region. In this connection a receiving groove for receiving the sealing ring can be provided in one or both opposing sealing walls.

A plurality of inner lines are arranged in the jacket pipe which are formed for example as data cables, electrical cables or fluid lines. A plurality of lines can run into a multi-point plug element so that with an insert movement a plurality of inner lines are simultaneously connected. According to the invention it is advantageous that the inner lines comprise separate connection elements at their ends. The inner lines can thus be connected or released independently of each other.

According to a preferred embodiment of the invention a connecting plate with intermediate plug elements for the connection elements of the inner lines is arranged between the connecting elements. The connecting plate can be inserted in a fitting and sealing manner in the annular inner space of the tubular shaft of the connecting elements. In addition the penetration of moisture into the inside of the jacket pipe is hereby prevented. The connecting plate with the intermediate plug elements additionally simplifies the putting together of the different inner lines of the individual line elements.

The connection or release of the inner lines is further improved according to the invention in that the inner lines are formed in a line section with an additional length having regard to the length of the jacket pipe and in that the inner lines are arranged within the jacket pipe with a free space which receives the additional length of the inner lines. Due to the additional length the inner lines project, in a drawn apart state, having regard to the outer jacket pipe. This axial projection allows a simple connection to the corresponding plug elements of the pipe element to be connected. Subsequently the jacket pipe can be pushed over the connected inner lines whereby the previously described outer flange connection on the jacket pipe is then closed. If a further line element is also connected at the opposite end of the line element the inner lines are squeezed together in axial direction so that the lines are laterally deflected. The additional length also prevents mechanical overload of the inner line, in particular in case of tensile loading of the supply line. The additional length of the inner lines can hereby be received in the free space in the jacket pipe provided in a defined way. The free space is formed in that the cross-sectional area of the inner hollow space of the jacket pipe is correspondingly greater than the cross-sectional areas of all inner lines arranged therein.

According to an embodiment of the invention it is particularly advantageous that the jacket pipe has an outer diameter which is greater than the outer diameter of the annular collar. It is further advantageous that the outer diameter of the jacket pipe is greater than or equal to the outer diameter of the annular tensioning clamp. It can hereby be ensured that in the connecting region of the line elements nothing projects radially over the jacket pipe. This allows ease of handling of the maritime supply line, for example if it must be lowered over the side of a supply vessel into water. Furthermore the risk of undesirable snagging and thus damage to the supply line is reduced. This compact design of the connection region also allows efficient winding of the supply line onto a drum or coil. This also reduces the wear of the maritime supply line.

The invention is described further below with the aid of preferred embodiments which are shown schematically in the drawings, in which.

Figure 2:
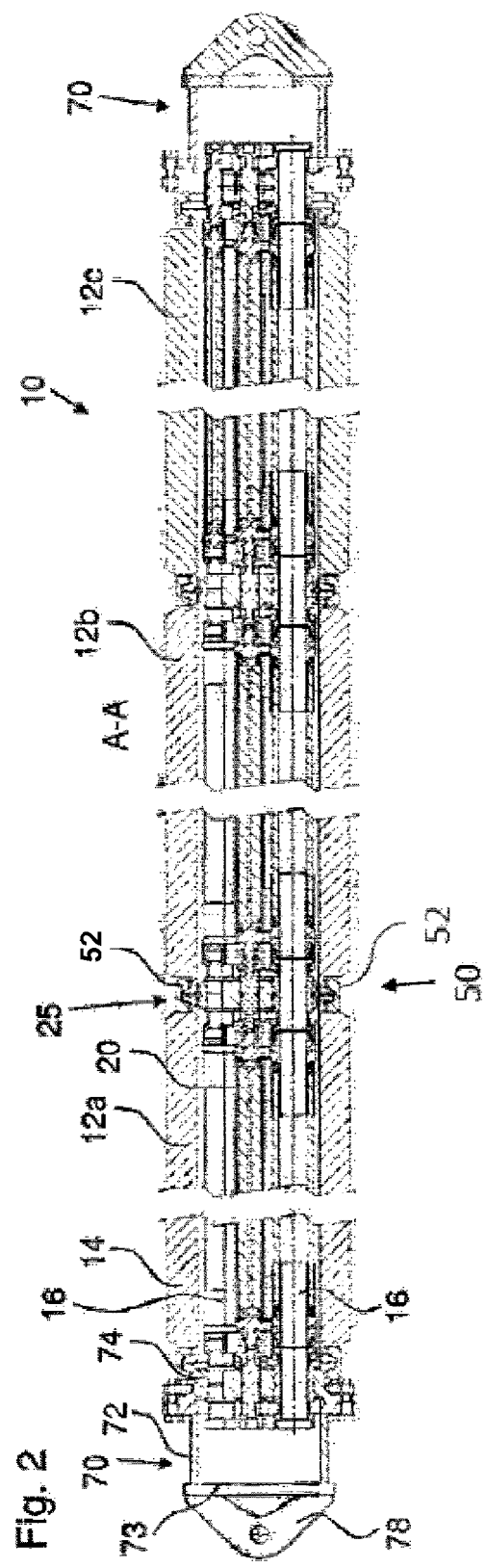
FIG. 2 shows a cross-sectional view of the supply line of FIG. 1 according to the section A-A with completely connected line elements.
Figure 3:
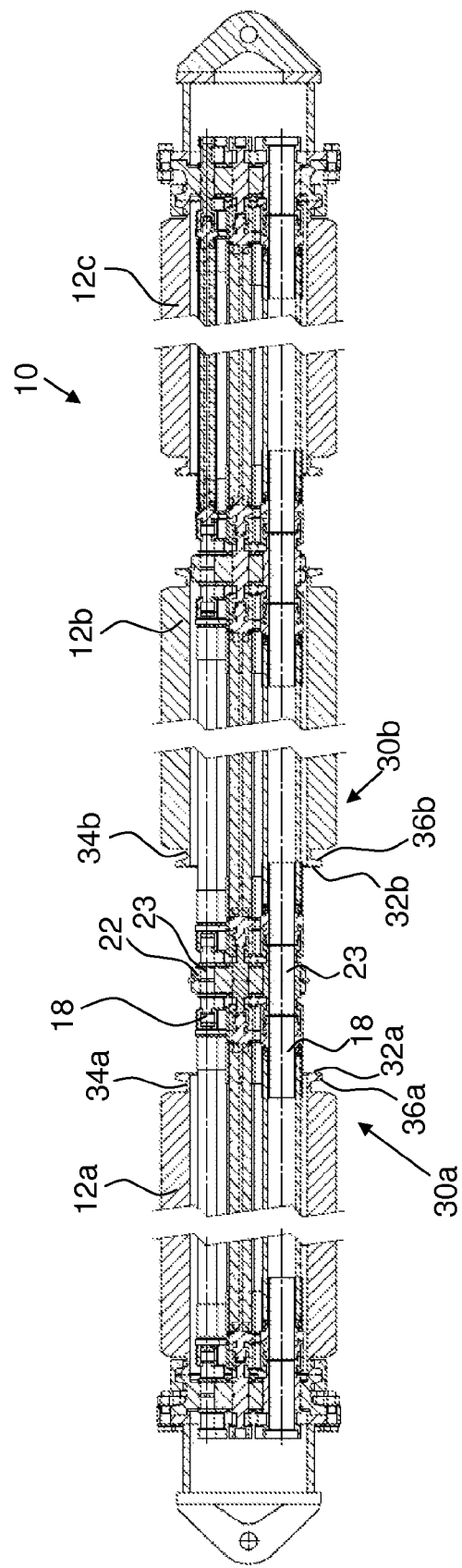
Figure 4:
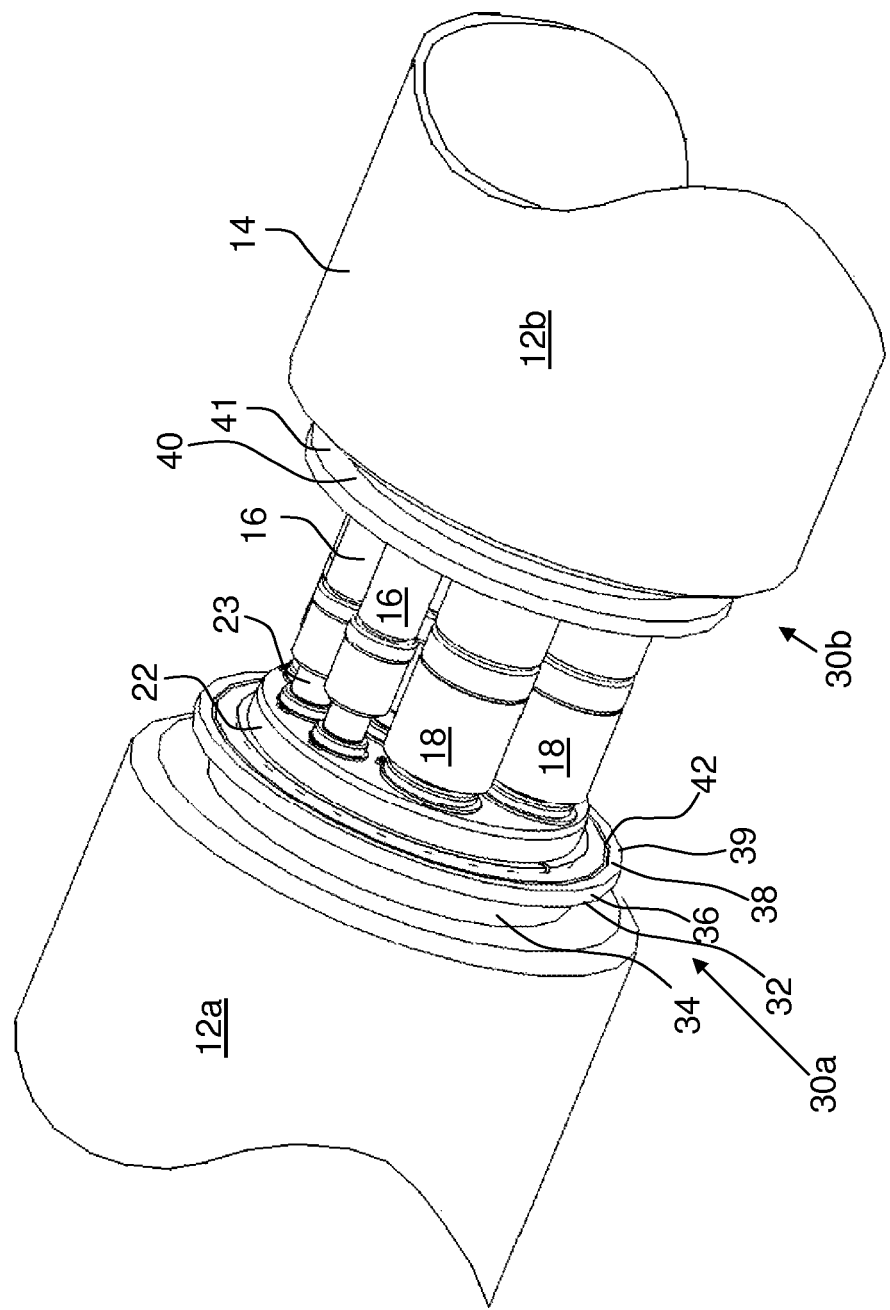
Figure 5:
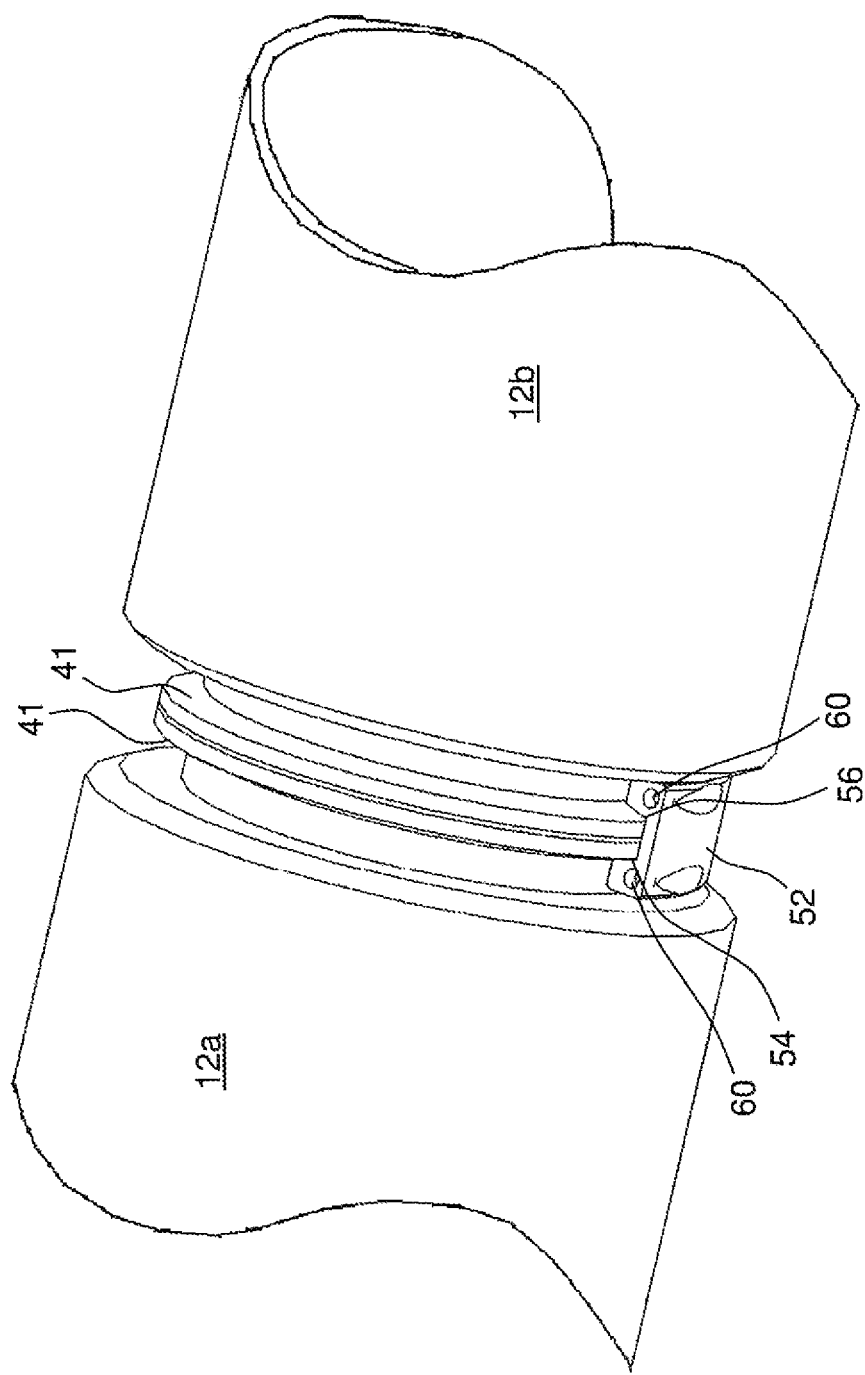

FIG. 3 a cross-sectional view corresponding to FIG. 2 of the supply line but with open jacket pipe;

FIG. 4 a perspective detailed view of a connection region of two line elements with open jacket pipe; and FIG. 5 a perspective detailed view corresponding to FIG. 4 with closed jacket pipe.

Figure 1:
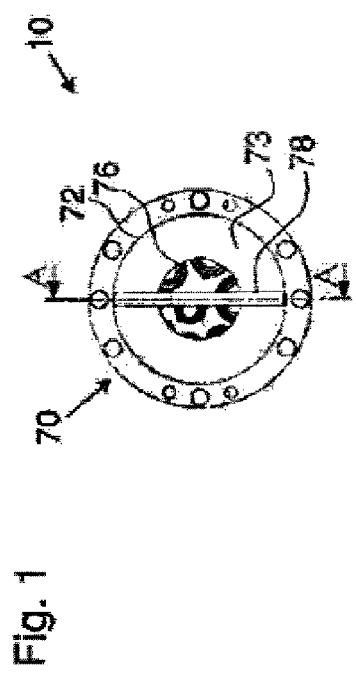
FIG. 1 shows a front view of a maritime supply line according to the invention.

The principal structure of a maritime supply line 10 according to the invention is explained initially in connection with FIGS. 1 and 3. As can be seen from FIGS. 2 and 3, the embodiment shown of an inventive supply line 10 is constructed from three line elements 12a, 12b, 12c. The line elements 12a, 12b, 12c with all parts are respectively formed to be the same and the structure thereof is thus described by way of example by reference to the line element 12a.

A plurality of inner lines 16 are arranged within a flexible jacket pipe 14. An equally formed metal connecting element 30a is arranged at each of the two outer ends of the jacket pipe 14. The connecting element 30a thereby comprises a sleeve-like shaft 34a which runs on its free edge for the formation of a connecting flange 32a into a radially projecting collar 36a. An opposing connecting element 30b of a line element 12b to be connected is formed in the same way with a shaft 34b and a connecting flange 32b with radially projecting collar 36b. The structure is described in greater detail below in association with FIGS. 4 and 5.

In order to connect the two line elements 12a, 12b initially plug-like connection elements 18 are connected at the ends of the inner lines 16 to intermediate plugs 23 which are arranged in a disc-like connecting plate 22. The connecting plate 22 can be pushed in a fitting and sealing manner into the cylindrical hollow space of the shafts 34a, 34b of the two connecting elements 30a, 30b. In the pushed together state which is shown in FIG. 2 the two connecting elements 30a, 30b lying one beside the other are incorporated by an annular tensioning clamp 50 and tensioned in a sealing manner against each other. A watertight connection 25 between the two line elements 12a, 12b is hereby created all in all.

An end holder 70 is arranged on each of the two end regions of the maritime supply line 10, which end holder 70 is shown in particular in FIG. 1 in a front view. The end holder 70 comprises a cylindrical closing element 72 with an annular covering plate 73 which comprises a middle passage 76. A holding bracket 78 is welded to the outer side of the covering plate 73 and serves in particular for transport purposes and for holding the supply line 10. The end holder 70 is connected via an adapter flange 74 to the corresponding connecting element 30 of the adjacent line element 12a.

FIG. 4 shows an intermediate state during connection of the two line elements 12a, 12b. The connection elements 18 of the inner lines 16 of the line element 12b to be connected are already connected with the intermediate plugs 23 in the connecting plate 22. The connecting plate 22 is pushed in a fitting and sealing manner into the tubular shaft 34 of the opposing connecting element 30a of the line element 12a. The jacket pipe 14 can now be pushed with the connecting element 30b of the line element 12b over the connected inner lines 16, whereby this is facilitated by a corresponding free space 20 within the jacket pipe 14. During this pushing together the abutment regions 38 come into contact with each other on the two connecting flanges 32. The abutment region 38 respectively comprises a planar annular sealing wall 39. A groove for receiving a sealing ring 42 is incorporated into a sealing wall 33. A tensioning region 40 with a conical tensioning flank 41 is formed on the radially projecting collar 36 on the rear side lying opposite the abutment region 38.

The functioning of the tensioning flank 41 is explained in greater detail in association with FIG. 5 which shows in a partially sectional view the connected line elements 12a, 12b. The two connecting flanges 32 lying one against the other are incorporated by a tensioning clamp 50, of which merely a part of an individual tensioning clamp shell 52 is shown. This tensioning clamp shell 52 has a U-shaped cross-section with a central inner groove. A first tensioning wall with a tensioning surface 54 and a second tensioning wall with a tensioning surface 56 are thereby formed which are angled having regard to the radial direction.

The angling of the two tensioning surfaces 54, 56 corresponds to the cone angle of the conical tensioning flanks 41 on the rear sides of the connecting flanges 30. By pulling together the two tensioning clamp shells 52 of the tensioning clamp 50 in the peripheral direction by means of a pulling device 60, of which merely a threaded bore is shown, the two tensioning clamp shells are pulled towards each other. Through this radial pulling together which is brought about by tightening two clamping screws (not shown) an axial tensioning force is caused via the conical formation of the tensioning surfaces 54, 56 and the associated tensioning flanks 41 which forces the two connecting flanges 30 of the line elements 12a, 12b towards each other. All in all a mechanically stable and sealed connection is hereby created which is at the same time particularly robust and compact.

The invention claimed is:

1. A maritime supply line comprising:
a plurality of watertight connections, each watertight connection of the plurality of watertight connections being provided between at least two line elements, each of the line elements comprising:
a segmented flexible jacket pipe,
at least two inner lines which are provided as inner line segments within the segmented flexible jacket pipe,
a connecting element for each of the at least two inner lines, the connecting element arranged at least at one end of the line element for the formation of the watertight connection to a line element to be connected, the connecting element and the corresponding inner line are axially aligned, and
a connecting flange with a radially projecting collar, on which a radially projecting collar of a connecting flange of the line element to be connected is capable of being placed,
wherein
for the formation of the watertight connection the two radially projecting collars are incorporated by at least one tensioning clamp and axially tensioned against each other,
an outer diameter of the jacket pipe is greater than or equal to an outer diameter of the tensioning clamp,
the inner lines comprise separate connection elements at their ends to be connected to inner lines of the line element to be connected, and
the outer diameter of the jacket pipe is greater than or equal to the outer diameter of the tensioning clamp for each watertight connection of the plurality of watertight connections along an entire length of the maritime supply line.

2. The maritime supply line according to claim 1, wherein the tensioning clamp is formed annularly with at least two tensioning clamp shells.

3. The maritime supply line according to claim 2, wherein the annular tensioning clamp comprises a pulling means, through which the at least two tensioning clamp shells is capable of being pulled together.

4. The maritime supply line according to claim 1, wherein an annular abutment region for placing the connecting flange of the line element to be connected is arranged on the connecting flange, and
a tensioning region is provided on a rear side of the collar facing away from the abutment region.

5. The maritime supply line according to claim 4, wherein the abutment region comprises a planar radial sealing wall, and
the tensioning region is formed conically with an annular conical tensioning flank.

6. The maritime supply line according to claim 5, wherein the tensioning clamp is formed with a U-shaped cross-section with two radially extending tensioning surfaces, of which at least one tensioning surface is conically formed corresponding to the conical tensioning region of the collar.

7. The maritime supply line according to claim 4, wherein at least one sealing ring is arranged on an annular sealing wall of the abutment region.

8. The maritime supply line according to claim 1, wherein a connecting plate with intermediate plugs for the connection elements of the inner lines is arranged between the connecting elements.

9. The maritime supply line according to claim 1, wherein the inner lines are formed in a line element, the length of the inner lines being longer by an additional length than the length of the jacket pipe, and the inner lines are arranged within the jacket pipe with a free space which receives the additional length of the inner lines.

10. The maritime supply line according to claim 1, wherein the jacket pipe has an outer diameter which is greater than the outer diameter of the radially projecting collar.

11. The maritime supply line according to claim 1, wherein a connecting plate is arranged between the connecting elements, and
the connecting plate and the connecting flange are radially aligned.

12. The maritime supply line according to claim 1, wherein a connecting plate is arranged between the connecting elements,
an annular abutment region is arranged on the connecting flange, and
the connecting plate, the connecting flange, the abutment region and the at least one tensioning clamp are radially aligned.

13. A maritime supply line with at least two line elements each of which comprises:
a segmented flexible jacket pipe,
at least two inner lines which are provided as inner line segments within the segmented flexible jacket pipe, and
a connecting element for each of the at least two inner lines, the connecting element arranged at least at one end of the line element for the formation of a watertight connection to a line element to be connected, the connecting element and the corresponding inner line are axially aligned, and
a connecting flange with a radially projecting collar, on which a radially projecting collar of a connecting flange of the line element to be connected is capable of being placed,
wherein
for the formation of the watertight connection the two radially projecting collars are incorporated by at least one tensioning clamp and axially tensioned against each other,
an outer diameter of the jacket pipe is greater than or equal to an outer diameter of the tensioning clamp,
the inner lines comprise separate connection elements at their ends to be connected to inner lines of the line element to be connected,
a connecting plate is arranged between the connecting elements, and
the connecting plate and the connecting flange are radially aligned.

14. The maritime supply line according to claim 13, comprising:
a plurality of the watertight connections, wherein each watertight connection of the plurality of watertight connections is provided between the at least two line elements, wherein the outer diameter of the jacket pipe is greater than or equal to the outer diameter of the tensioning clamp for each watertight connection of the plurality of watertight connection along an entire length of the maritime supply line.

15. A maritime supply line with at least two line elements each of which comprises:
   a segmented flexible jacket pipe,
   at least two inner lines which are provided as inner line segments within the segmented flexible jacket pipe, and
   a connecting element for each of the at least two inner lines, the connecting element arranged at least at one end of the line element for the formation of a watertight connection to a line element to be connected, the connecting element and the corresponding inner line are axially aligned, and
   a connecting flange with a radially projecting collar, on which a radially projecting collar of a connecting flange of the line element to be connected is capable of being placed,
   wherein
      for the formation of the watertight connection the two radially projecting collars are incorporated by at least one tensioning clamp and axially tensioned against each other,
      an outer diameter of the jacket pipe is greater than or equal to an outer diameter of the tensioning clamp,
      the inner lines comprise separate connection elements at their ends to be connected to inner lines of the line element to be connected,
      a connecting plate is arranged between the connecting elements,
      an annular abutment region is arranged on the connecting flange, and
      the connecting plate, the connecting flange, the abutment region and the at least one tensioning clamp are radially aligned.

16. The maritime supply line according to claim 15, comprising:
   a plurality of the watertight connections, wherein each watertight connection of the plurality of watertight connections is provided between the at least two line elements,
   wherein the outer diameter of the jacket pipe is greater than or equal to the outer diameter of the tensioning clamp for each watertight connection of the plurality of watertight connections along an entire length of the maritime supply line.

* * * * *